Sept. 23, 1947.　　　G. H. JUDKINS　　　2,427,862
FILTER ELEMENT
Filed Dec. 22, 1945　　　2 Sheets-Sheet 1

Inventor:
George H. Judkins
By Paul O. Pippel
Atty.

Sept. 23, 1947.     G. H. JUDKINS     2,427,862
FILTER ELEMENT
Filed Dec. 22, 1945     2 Sheets-Sheet 2

Inventor:
George H. Judkins
By Paul O. Pippel
Atty.

Patented Sept. 23, 1947

2,427,862

UNITED STATES PATENT OFFICE 2,427,862

FILTER ELEMENT

George H. Judkins, Berwyn, Ill., assignor to International Harvester Company, a corporation of New Jersey Application December 22, 1945, Serial No. 636,664

7 Claims. (Cl. 210—169)

This invention has to do with filtering devices of the character employing a filtering envelope immersed in a body of fluid to be filtered thereby and urged collapsed by the pressure of said body thereon pursuant to the filtering operation and more particularly concerns a new form of envelope and drainage means therefor and a casing cooperable with the envelope in a manner that it is utilizable therewith as a replaceable cartridge.

The general object of this invention is the provision of an improved filter unit employing a filtering envelope with a drainage and sealing structure which is cooperable with the envelope when the latter is rolled spirally into a substantially cylindrical formation and thus contracted into a readily enclosable space.

Another object is the provision of a filtering envelope that is maintained open along an edge by a flexible separating and drainage structure and rolled spirally with such structure and embraced adjacent to said edge by a circular collar adapting the unit to be used as a replaceable cartridge in a casing having a seat against which the collar can rest. It is also contemplated that the inner convolution of the spirally wound envelope shall be upon a spool concentric with said collar and fittable about a conduit for admitting unfiltered fluid into the fluid body ambient to the envelope.

Another object is the provision of a filter device wherein there is a cylindrical casing transversely divided by a foraminous structure into a cartridge receiving section and a filtered fluid receiving section, and a spirally wound filtering envelope having an end at which its spirally wound edge is open and disposed in the cartridge receiving section coaxially of the casing and with said end resting against said foraminous structure to facilitate discharge of filtered fluid from within the envelope through said structure while the body of the spirally wound envelope plugs the casing to prevent leakage from the cartridge receiving section to the foraminous structure excepting through the envelope.

These and other desirable objects inherent in and encompassed by the invention will be more clearly understood upon reading the ensuing description with reference to the annexed drawings, wherein.

Figure 1:
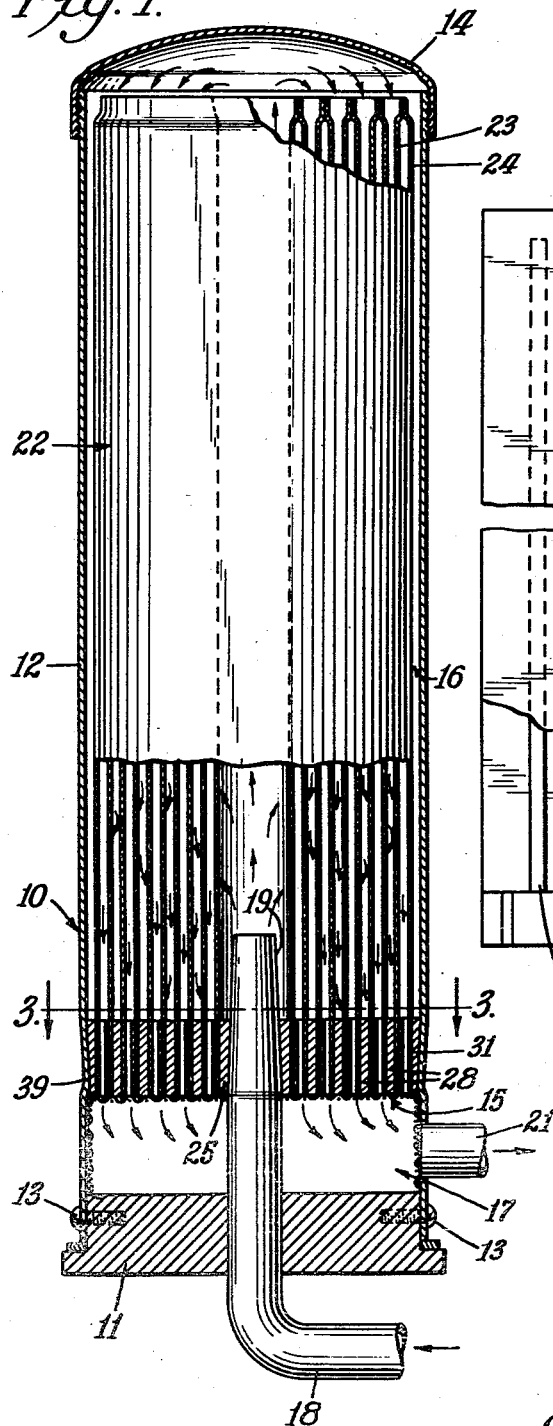
Figure 1 is a sectional view taken axially through the casing of a liquid filtering device embodying a preferred form of the invention and containing a replaceable filter unit or cartridge which is shown partly in elevation and partly in section for illustrating the manner in which the cartridge fits within and cooperates with the casing.

The device herein illustrated is particularly adapted for filtering lubricating oil or fuel oil for internal combustion engines. Said device includes a casing 10 having a lower end or base 11 having a cylindrical side wall 12 of sheet metal secured thereto at an end by screws 13. The opposite and upper end of the casing wall 12 is closed by a screw cap 14.

A foraminous structure 15 in the form of an inverted cup formed of heavy screen wire or the equivalent extends diametrically across the cylindrical casing wall 12 and thereby divides the casing into a filter unit receiving section 16 and a filtered fluid receiving section 17. An inlet conduit 18 extends inwardly of the casing through the end wall 11 and the foraminous structure 15 into the filtered unit receiving section 16. An exterior side wall portion 19 of this conduit in the casing section 16 is tapered. This conduit is for the conduction of fluid to be filtered into the casing section 16. An outlet conduit 21 for filtered fluid is secured to the casing wall 12 in communicative relation with the casing section 17.

A removable filtering unit or cartridge 22 is shown in the casing 10 for cooperation therewith. This unit 22 is constructed from two originally flat sheets 23 and 24 of filter paper. These sheets are treated for wet strength and to increase their resistance to deterioration by the medium to be filtered. Ordinarily the treatment comprises coating the fibers of the paper with a small quantity of phenolic resin deposited by a volatile carrier.

Figure 2:
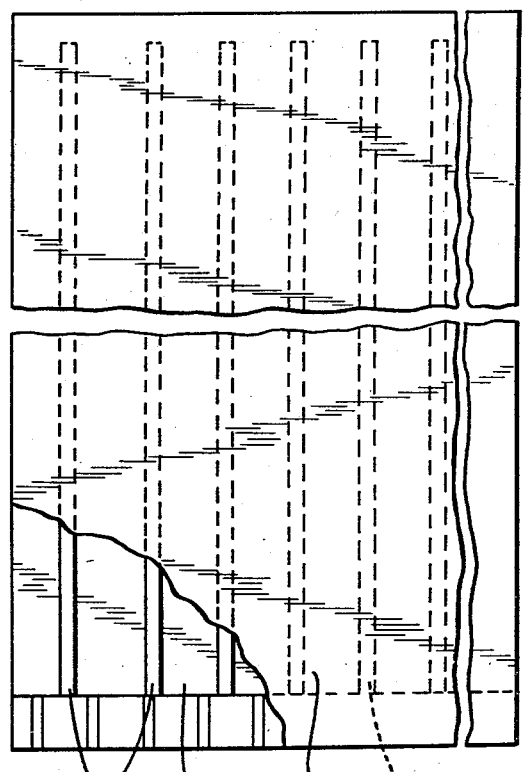
Figure 2 is a fragmentary plan view, drawn to a larger scale, of the filter envelope shown in Figure 1, the view being fragmentary and having a portion of one of the envelope side walls broken away for showing interior structural details.
Figure 4:
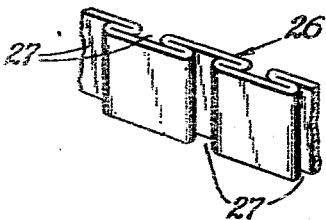
Figure 4 is a fragmentary perspective view of a spacer and fluid conducting strip employed between open-edged marginal portions of the envelope side wall.

While the filtering sheets 23 and 24 are in flatwise opposed relation as illustrated in Figure 2, they are wound spirally about a tubular member or spool 25. This spool may be a phenolic-resin-impregnated paper article. Said spool is only long enough for registering with marginal edge portions of the sheets 23 and 24. This is also true of a separating strip 26 which is wound between these edge portions of the filtering sheets. In Figure 4 the strip 26, which serves as spacer and envelope drainage means for the unit as more particularly pointed out hereinafter, can be seen to contain a series of reverse folds which result in drainage passages 27 extending transversely of the strip and axially of the completed unit.

Figure 3:
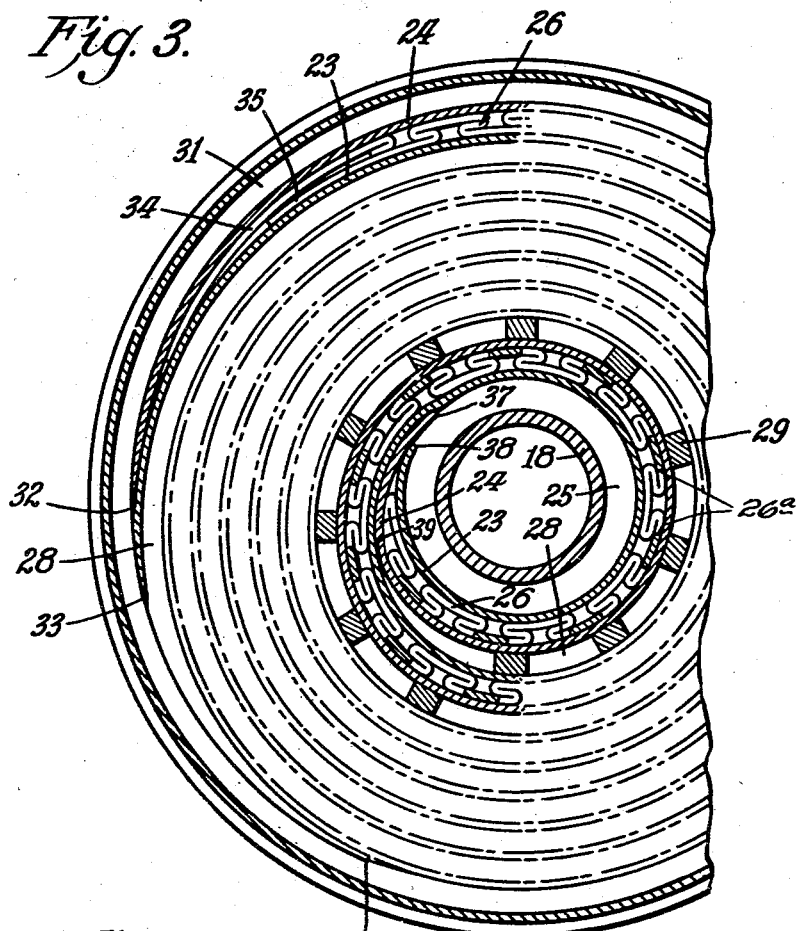
Figure 3 is a sectional view taken on the line 3—3 of Figure 1.

In Figure 3 the sheet 23 is shown in direct contact with the spool 25 substantially throughout the inner convolution. The inner end of the filtering sheet 24 is shown in Figure 3 in slightly overlapping relation with respect to the inner end of the sheet 23 and therefore in contact with the outer periphery of the spool 25 for a short distance. Those portions of the sheets 23 and 24 in contact with the spool 25 are adhesively attached thereto. The adhesive employed may be a phenolic resin paste or a vinyl resin paste, the former being a well-known thermo-setting compound and the latter being a thermo-plastic compound. The spacer strip 26 is disposed between those edge portions of the sheets 23 and 24 that are in radial registration with the spool, and after the first convolution, a spacer strip 28 is started to be wound into the spiral formation. Axially extending spacer elements 26ª which are disposed in the envelope are formed integrally with the strip 26. Spacer strip 28 is exteriorly of the envelope formed by the paired filtering sheets 23 and 24 in contrast to the spacer strip 26 which is within the spirally wound envelope. Additional exterior spacing means is provided in the form of axially extending members 29 which like the spacer strip 28 may be made of phenolic-resin-impregnated paper. These members 29 may be made integrally with the strip 28 if desired.

The winding process is continued until the final convolution of the sheet 24 has a diameter substantially equal to that of the inner periphery of a retainer ring 31. This outer convolution is pressed axially into the ring, and to cause this convolution to conform more nearly to the inner periphery of the ring 31, the outer end 32 of the filtering sheet 24 is terminated short of the outer end 33 of the sheet 23, and a separate short piece 34 of the material from which the spacing strip 26 is formed is placed in overlapping relation with the outer end portion 35 of said strip 26 and projected thereupon between the sheets 23 and 24. In this manner the outer terminal of the structure consisting of the sheets 23 and 24 and the separating structure therebetween is tapered and thereby caused to conform more nearly to the space between the circular interior of the ring 31 and the next to the outer convolution of the spirally wound structure 23—24. The upper edges of the filter sheets 23 and 24 are adhered together as shown in Figure 1, making a spiral envelope of which the sheets 23 and 24 form the side walls. The exterior surfaces of these envelope side walls are in sealed relation with the spiral separator strip 28. This sealed relation is preferably augmented by an adhesive, preferably phenolic resin.

In Figure 3 the end 33 of the filter sheet 23 is shown slightly embedded into the paper retaining ring 31 and into the adjacent portion of the spacer strip 28. This end 33 of the filter sheet 23 is also illustrated as being slightly tapered at its end whereby the three parts 31, 23, and 28 form a complete seal at the end 33 of said sheet 23. While the thickness of these deformed parts about the sheet end 33 and the amount of their deformities have been exaggerated in the drawings, the illustration is thought to be representative. Similar tapering for the end 32 of filter sheet 24 is illustrated as well as deformities in the ring 31 and the adjacent portion of the filter sheet 23. Also the outer end 36 of the spacer strip 28 is illustrated as being tapered and embedded slightly into the ring 31 and into the outer wall of the adjacent envelope convolution. Correspondingly exaggerated sheet thicknesses, degrees of tapering, and amounts of deformities are shown for the inner ends 37 and 38 of the envelope sheets 24 and 23 and for the inner end 39 of the separating strip 28. The compressibility of these paper filter sheets, of the spacer members 26 and 28, and of the spool 25 and the ring 31 is sufficient to adapt the parts to fit together at their ends such as 32, 33, and 36 so no leakage can occur exteriorly of the upper walls axially of the spirally wound structure at any part thereof contained between the concentrically arranged spool 25 and collar 31. When the unit is assembled as described, it consists of a base portion embraced by the collar 31, and this base portion contains a plurality of drainage channels 27 for the spirally formed envelope.

While the cover cap 14 is removed from the casing 10, the filtering unit can be inserted downwardly into the casing while sliding the spool 28 over the tapered end of the conduit 18 and concurrently sliding the collar 31 along a tapered wall section 39 of the casing. The tapered periphery 19 of the conduit or tube 18 causes the collar 19 to be wedged tightly thereonto and forms a sealed association therewith. A like sealed association is established between the collar 31 and the inner periphery of the tapered casing wall section 39.

After the cover 14 has been replaced, the apparatus is conditioned for use. The fluid entering the casing through the conduit 18 completely fills the chamber 16 incident to flowing over the upper sealed edges of the envelope convolutions and thence downwardly between the convolutions in the spaces assured by the vertically sealed spacing strips 29, such fluid filtering through the envelope side walls and then flowing downwardly between these envelope side walls in the filtered condition through the passages 27 of the spacer strip 26 and through the foraminous structure 15 for discharge through the outlet conduit 21. Endwise displacement of the unit downwardly by the pressure of fluid in the chamber 16 is resisted by the wedging action of the tapered portion 19 of the inlet tube and the tapered wall portion 39 of the casing as well as by the foraminous structure 15.

Having thus described a single preferred embodiment of the invention with the view of completely and concisely illustrating the invention, I claim:

1. A fluid filtering unit comprising an envelope having contiguously opposed side walls in sealed relation to each other along one edge and at their ends, said envelope extending spirally from one end to the other, spacer and envelope drainage means disposed between marginal portions of said side walls adjacently to the other edge thereof, an annular spool member coaxially within and in sealing relation with the inner convolution of the spiral envelope in radial registry with said side wall marginal portions, and an annular collar coaxially about and in sealing relation with the outer of said convolutions in radial registry with said side wall marginal portions, and said convolutions being in sealed relation with those adjacent thereto along said side wall marginal portions to preclude the passage of fluid therebetween axially of the unit.

2. A fluid filtering unit comprising an envelope having contiguously opposed side walls in sealed relation to each other along one edge and at their ends, said envelope extending spirally from one end to the other, spacer and envelope drainage means disposed between marginal portions of said side walls adjacently to the other edge thereof, a spacer-sealing structure arranged spirally between the envelope convolutions along said marginal portions to space said convolutions while precluding the passage of fluid axially through the unit axially of such convolutions, an annular spool member coaxially within and in sealing relation with the inner convolution of the spiral envelope in radial registry with said side wall marginal portions, and an annular collar coaxially about and in sealing relation with the outer of said convolutions in radial registry with said side wall marginal portions.

3. A fluid filtering unit comprising an envelope having contiguously opposed side walls in sealed relation to each other along one edge and at their ends, said envelope extending spirally from one end to the other, spacer and envelope drainage means disposed between marginal portions of said side walls adjacently to the other edge thereof, spacer elements disposed between the envelope convolutions and spaced circumferentially thereof to provide space therebetween for the entry of fluid past said one edge of the envelope, an annular spool member coaxially within and in sealing relation with the inner convolution of the spiral envelope in radial registry with said side wall marginal portions, and an annular collar coaxially about and in sealing relation with the outer of said convolutions in radial registry with said side wall marginal portions, and said convolutions being in sealed relation with those adjacent thereto along said side wall marginal portions to preclude the passage of fluid therebetween axially of the unit.

4. A fluid filtering unit comprising an envelope having contiguously opposed side walls in sealed relation to each other along one edge and at their ends, said envelope extending spirally from one end to the other, spacer and envelope drainage means disposed between marginal portions of said side walls adjacently to the other edge thereof, a spacer-sealing structure arranged spirally between the envelope convolutions along said marginal portions to space said convolutions while precluding the passage of fluid axially through the unit axially of such convolutions, circumferentially spaced spacer elements disposed between the envelope convolutions and extending between said spacer sealing structure and the one edge of the envelope to supplement the spacing utility of said structure, an annular spool member coaxially within and in sealing relation with the inner convolution of the spiral envelope in radial registry with said side wall marginal portions, and an annular collar coaxially about and in sealing relation with the outer of said convolutions in radial registry with said side wall marginal portions.

5. A fluid filtering device comprising a cylindrical casing, a foraminous structure within said casing in a manner transversely dividing the same into a filter cartridge receiving section and a filtered fluid receiving section, a fluid inlet tube projecting through said foraminous structure coaxially of the casing into said cartridge receiving section, fluid outlet means leading communicatively from the filtered fluid receiving section of the casing, and a filtering cartridge disposed in said cartridge receiving section of the casing against said foraminous structure, said cartridge comprising a spool in slidable sealed circumscribing relation with said tube, a collar in coaxial radially-alined and spaced relation to said spool and in slidable sealed relation with the casing wall, and a spiral filtering envelope arranged coaxially in said cartridge receiving section of the casing, said envelope having an open spiral edge portion contiguously to said foraminous structure and secured to and between said spool and said collar.

6. The combination set forth in claim 5, and wherein said tube and said casing have respective circular wall portions in radially spaced concentric relation for respective sliding sealed relation with the inner periphery of said spool and with the outer periphery of said collar, and wherein at least one of said wall portions is axially tapered for radially compressing that portion of the cartridge embraced by the collar as said collar and spool are slid into position on said wall portions.

7. A fluid filtering device comprising a cylindrical casing, a foraminous structure within said casing in a manner transversely dividing the same into a filter cartridge receiving section and a filtered fluid receiving section, said casing including fluid inlet means communicating with said cartridge receiving section and fluid outlet means communicating with said filtered fluid receiving section, and a filtering cartridge disposed in said cartridge receiving section of the casing against said foraminous structure, said cartridge comprising a collar in coaxial slidable sealing relation, the casing wall at a circumferential section adjacent to the foraminous structure, and a spiral filtering envelope arranged coaxially in said cartridge receiving section of the casing, said envelope having an open spiral edge portion mounted in said collar contiguously to and facing said foraminous structure, and the portions of said convolutions embraced by said collar being in sealed relation to prevent leakage from between the convolutions to the foraminous structure.

GEORGE H. JUDKINS.